US008683031B2

(12) United States Patent
Green et al.

(10) Patent No.: US 8,683,031 B2
(45) Date of Patent: Mar. 25, 2014

(54) METHODS AND SYSTEMS FOR SCANNING AND MONITORING CONTENT ON A NETWORK

(75) Inventors: Kenneth Green, Baltimore, MD (US); Joseph Patanella, Annapolis, MD (US); Phillip Smith, Bowie, MD (US)

(73) Assignee: Trustwave Holdings, Inc., Chicago, IL (US)

( * ) Notice: Subject to any disclaimer, the term of this patent is extended or adjusted under 35 U.S.C. 154(b) by 1821 days.

(21) Appl. No.: 10/976,181

(22) Filed: Oct. 29, 2004

(65) Prior Publication Data

US 2006/0106866 A1    May 18, 2006

(51) Int. Cl.
*G06F 15/173*    (2006.01)
*G06F 15/16*    (2006.01)

(52) U.S. Cl.
USPC ........................................... 709/224; 709/245

(58) Field of Classification Search
USPC .......................................................... 709/224
See application file for complete search history.

(56) References Cited

U.S. PATENT DOCUMENTS

| | | | |
|---|---|---|---|
| 6,957,348 B1 | 10/2005 | Flowers et al. | |
| 2002/0156917 A1* | 10/2002 | Nye | 709/238 |
| 2003/0009696 A1* | 1/2003 | Bunker V. et al. | 713/201 |
| 2003/0177190 A1* | 9/2003 | Moody et al. | 709/206 |
| 2004/0260836 A1* | 12/2004 | Fearing | 709/245 |
| 2005/0105513 A1* | 5/2005 | Sullivan et al. | 370/352 |
| 2006/0153153 A1* | 7/2006 | Bhagwat et al. | 370/338 |
| 2006/0153173 A1* | 7/2006 | Beck et al. | 370/352 |
| 2006/0167857 A1* | 7/2006 | Kraft et al. | 707/3 |
| 2006/0200556 A1* | 9/2006 | Brave et al. | 709/224 |

OTHER PUBLICATIONS

International Bureau, "International Preliminary Report on Patentability," issued in connection with application No. PCT/US2005/038893, on Mar. 3, 2009, (4 pages).
International Searching Authority, "Written Opinion of the International Searching Authority," issued in connection with application No. PCT/US2005/038893, on Apr. 3, 2008, (3 pages).

* cited by examiner

*Primary Examiner* — Gerald Smarth
(74) *Attorney, Agent, or Firm* — Hanley, Flight & Zimmerman LLC

(57) ABSTRACT

The invention addressed methods and systems of scanning and monitoring network locations and resources such as websites and webpages. The method scans the webpages for content and compliance with predefined standards, and reports the results in a non-technical format. The method can also scan and monitor any website on the Internet, categorize its content, and validate its compliance with application, presentation or content standards, or any combination of the above.

24 Claims, 3 Drawing Sheets

METHODS AND SYSTEMS FOR SCANNING AND MONITORING CONTENT ON A NETWORK

FIELD OF THE INVENTION

The present invention relates to methods and systems of scanning, searching, storing, archiving, analyzing and monitoring online software applications and content. Specifically, the present invention relates to scanning analyzing and evaluating the applications and content on an Internet web page or group of web pages in one or more related web sites for compliance with any of regulatory, security, industry-wide or vendor specific standards.

BACKGROUND OF THE INVENTION

Online commerce is a rapidly growing sector of the global economy. Merchants are attracted to online retailing for its scalability and cost-effectiveness, while customers are attracted to it for its convenience and ease of use. As sellers and businesses establish online commerce sites and affiliate with other merchants, the proliferation of web servers, pages and commerce applications becomes increasingly more difficult to manage. Furthermore, because these multiple servers, data warehouses and networks become more scattered and spread out geographically, merchants and business are finding it more difficult to maintain a consistent corporate image and brand identity. In addition, because each of these servers and pages may be administered or managed by different people within the same or even different organizations, it is also difficult for the merchant or business to comply with numerous regulatory, security, industry and internal standards.

Vendors who sell electronic and web commerce applications to facilitate online transactions are faced with similar difficulties in enforcing their own content standards. For example, an online transaction vendor may wish to charge a different rate for its transaction service depending on a variety of factors, including, for example, the number of transactions conducted on merchant's site, the total sales, the type of goods or services offered, or the type of site. When the vendor and the merchant agree on a pricing schedule, the vendor must ensure that the merchant is complying not only with industry regulations, but also with its own standards. The vendor needs to know that the merchant is not using its transaction services to conduct commerce that would be inappropriate or require a different fee arrangement.

Furthermore, in those situations where a single merchant runs their site across a number of web servers, the vendor needs to treat those different servers as one, and that all of those separate servers are all complying with the appropriate standards. However, the process of assessing and verifying compliance with standards can be costly and time consuming, and in many cases incomplete because sites that are affiliated with a particular merchant but not under that merchant's direct control are often not checked for compliance with this standard.

What is needed is a system that can search, scan, store, analyze and assess all of the online content of a particular merchant website based on a combination of technical and textual criteria that captures all of the website associated with a merchant, identifies those that are and are not under the control of the merchant, and determines the level of compliance with any of a number of different criteria, some of which may be specific to or different for each merchant. Furthermore, the output of this system must be easily understood by compliance officers and corporate executives who may not have a technical background. Furthermore, the system should periodically monitor the content of the merchant sites to ensure that they remain in compliance.

SUMMARY OF THE INVENTION

Accordingly, the present invention is directed to systems and methods for scanning and monitoring content on a network that substantially obviates one or more of the problems due to limitations and disadvantages of the related art.

An advantage of the present invention is to provide a method for scanning a network for network locations and resources at those locations for specific content or formatting and then periodically monitoring those resources to verify their content.

Another advantage of the present invention is to provide a method for scanning and monitoring sites on the Internet associated with an enterprise, and specifically scanning and monitoring all of the websites, servers, and webpages associated with the enterprise to validate their content.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, provides a method for scanning and monitoring content on a computer network which includes scanning the network to identify network resources on which the relevant content appears and the location of said resources on the network; scanning each of the identified network locations to determine any network address information, said network address information identifying the computer or computer system related to that network location; resolving each of said identified network locations by network address information into a one or more network addresses; profiling said network resources by classifying the content available at said resource; acquiring said relevant content, said acquiring including copying said network resource and said content to another computer system; analyzing said network resource by breaking up the content at that network resource into one or more constituent elements; identifying and analyzing any links or relationships on a network resource to any other network resource and categorizing said links into local, neighbor, or remote links based on their relationship with the current resource being analyzed; identifying broken links, in which the network resource linked to is not available; keyword and phrase scanning of content on said network resource for predetermined keywords and determining whether said keywords are present on the network resource being analyzed; pattern analysis of content in order to obtain instances of specified language patterns, such as physical mail addresses and phone numbers; fingerprinting content on said network resource to obtain a quantitative fingerprint for at least one of said constituent elements of said content; and fingerprinting said network location to obtain a single quantitative measurement for all of said network resources and content at said network location.

In another aspect of the present invention, a method for scanning and monitoring a website on the Internet includes scanning the webpages at a website; summarizing the website by identifying the content, name, title, number of predetermined keyword/phrase/pattern hits and categories of at least one webpage of said site; and summarizing technical information about said site, including identifying the vendors information and IP addresses of any web servers on which said website runs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
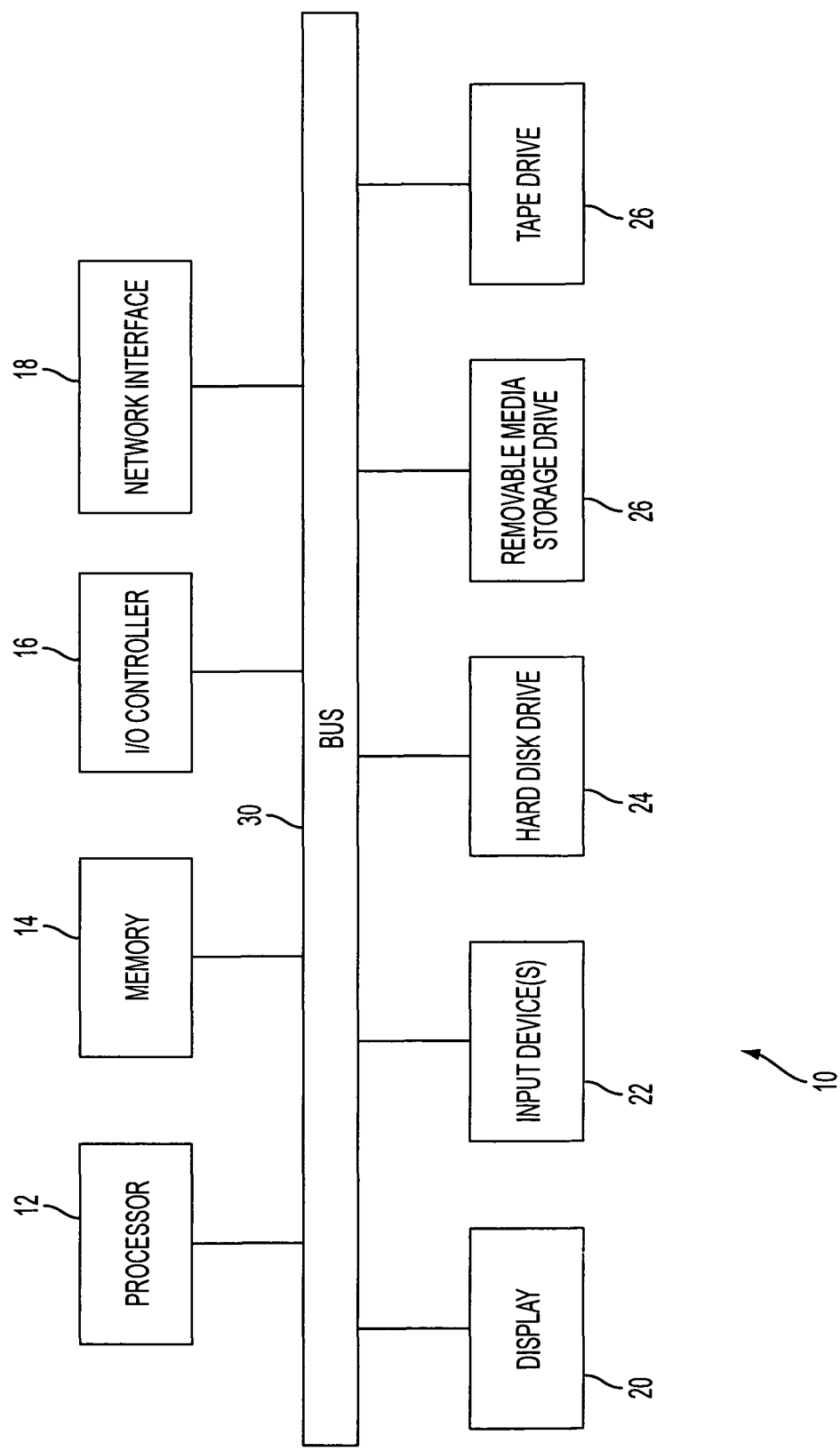
FIG. 1 is a diagram illustrating a computer system according to an embodiment of the present invention.

Reference will now be made in detail to an embodiment of the present invention, example of which is illustrated in the accompanying drawings. It is to be understood that the terminology used herein is for the purpose of describing particular embodiments only, and is not intended to limit the scope of the present invention which will be limited only by the appended claims.

Thus, for example, reference to "a tool" is a reference to one or more tools and includes equivalents thereof known to those skilled in the art.

Unless defined otherwise, all technical and scientific terms used herein have the same meaning as commonly understood to one of ordinary skill in the art to which this invention belongs. Although any methods, devices, and materials similar or equivalent to those described herein can be used in the practice or testing of the invention, preferred methods, devices and materials are now described.

Reference will now be made in detail to implementations of the present invention as illustrated in the accompanying drawings. Wherever possible, the same reference numbers will be used throughout the drawings and the following description to refer to the same or like parts.

As used herein, the Internet refers at least to a collection of networks and gateways that use the transmission control protocol (TCP) or Internet protocol (IP) suite of protocols to communicate with one another. The World Wide Web (WWW) refers at least to a set of inter-linked hypertext documents residing on hypertext transport protocol (HTTP) servers. As used herein, WWW also refers at least to documents accessed on secure servers, such as HTTP servers (HTTPS), which provide for encryption and transmission through a secure port. WWW documents, which may be referred to herein as web pages can, for example, be written in hypertext markup language (HTML). As used herein, the term "website", or simply "site", refers at least to one or more HTML documents (or "webpages") and associated files, scripts, and databases that may be presented by one or more HTTP or HTTPS servers on the WWW. The term "web browser" refers at least to software and hardware that lets a user view HTML documents and access files and software related to those documents. Other communications protocols may be used for the transmission and retrieval of on-line content, including the File Transfer Protocol (FTP), Secure Copy Protocol (SCP), Internet Relay Chat (IRC) and peer-to-peer protocols such as Gnutella.

Systems and methods in accordance with the invention can be implemented using any type of general purpose computer system, such as a personal computer (PC), laptop computer, server, workstation, personal digital assistant (PDA), mobile and/or wireless communications device, interconnected group of general purpose computers and the like, running any one of a variety of operating systems. An example of a general-purpose computer system usable with at least one embodiment of the present invention is illustrated in FIG. 1.

Referring briefly to FIG. 1, the general purpose computer system 10, on which the scanning and monitoring system disclosed herein is run, includes a central processor 12, a main memory unit 14 for storing programs and/or data, an input/output controller 16, a network interface 18, a display device 20, one or more input devices 22, a fixed or hard disk drive unit 24, a removable media storage drive (i.e., floppy disk drive or compact disk (CD) drive) 26, a tape drive unit 28, and a data bus 30 which couples these components so as to allow communication there between as well as communication with other computer systems. Such communication occurs either via direct connection, via the world wide web, or via other means of communication such as cable, phone lines, microwave and wireless communication.

The central processor 12 used in the computer system 10 can be any type of microprocessor, such as a PENTIUM™ processor, made by Intel of Santa Clara, Calif. The display device 20 can be any type of display, such as a printer, or a liquid crystal display (LCD), cathode ray tube display (CRT), light emitting diode (LED), plasma gas (PG), and the like capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet and/or connect with another computer system upon which the systems and methods of the inventions disclosed herein can be practiced.

Those skilled in the art will appreciate that computer systems 10 embodying the present invention need not include every element shown in FIG. 1, and that equivalents to each of the elements are intended to be included within the spirit and scope of the invention. For example, the computer system 10 need not include the tape drive 28, and may include other types of drives, such as CD or Digital Video Disk (DVD) drives. CD drives can, for example, be written to and read from, thereby storing some or all of the data in the databases described herein.

In at least one embodiment of the present invention, one or more computer programs define the operational capabilities of the scanning and monitoring system. These programs can be loaded into the computer system 10 in many ways, such as via the hard disk drive 24, the media storage drive 26, the tape drive 28, or the network interface 18. Alternatively, the programs can reside in a permanent memory portion (i.e., a read-only-memory (ROM) chip) of the main memory 14. In another embodiment, the computer system 10 can include specially designed, dedicated, hard-wired electronic circuits that perform all functions described herein without the need for instructions from computer programs.

In at least one embodiment of the present invention, the scanning and monitoring system is part of a client-server system, in which a client sends requests to a server and a server responds to requests from a client. Of course, a "client" can be broadly construed to mean one who requests or gets the file, and "server" can be broadly construed to be the entity that downloads the file. The scanning and monitoring system can be either a client system or a server system. In one embodiment, the invention is implemented at the server side and receives and responds to requests from a client, such as a reader application running on a user computer.

The client can be any entity, such as the computer system 10, or specific components thereof (e.g., terminal, personal computer, mainframe computer, workstation, a wireless hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM®, LINUX, OS/2®, or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (i.e., a PDA), an Internet appliance, a telephone, an electronic reader device, or any other such device connectable to the computer network.

The server can be any entity, such as computer system 10, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages (ASP), server side include (SSI) functions and the like.

Embodiments of the invention can be implemented using computer technologies such as software applications, computer-readable program media, data structures, carrier wave signals, user interfaces, and application program interfaces. For example, software embodying the present invention in one embodiment, resides in at least one application running on the computer system 10. In at least one embodiment, the present invention is embodied in a computer-readable program medium usable with the computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. One embodiment of the present invention also can be embodied in an application programming interface (API) or a user interface. In addition, the present invention, in one embodiment, is embodied in a data structure.

In one embodiment, the present invention includes systems and methods that scan the content of a user's website and assess that user's level of compliance with certain standards such as presentation, content, or security. The invention translates that scanning and monitoring into a report detailing the site's level of compliance. The report is generated by the scanning and monitoring system in response to the user answering certain questions which are focused on, for example, a regulatory requirement, or focused on a required level of security in a computer system. The report can also be generated by the scanning and monitoring system after the results of a scan of the user's computer system are known. Or the scanning and monitoring system could generate a report by incorporating both sets of results. The process may operate in three distinct steps: an initial input phase, a scan phase, and an output phase.

The present invention is applicable to a number of embodiments relating to content scanning, including but not limited to content detection, corporate image or brand identity protection and site inventory in application profiling. In one embodiment, the present invention relates to content detection in which the compliance standard that is established relates to a content that is forbidden from appearing on a client's networks based on a regulatory, statutory, security or vendor specific standards. For example, a credit card association such as VISA, MasterCard, Discover, or American Express may have specific guidelines governing the content of an online web commerce site that uses their cards. In another embodiment the content may be data traffic flowing in to or out from a local or wide area network that must be scanned for sensitive or confidential information.

In this example, the standard may require that the site not include any text or content of an obscene or profane nature or that the subject matter of the site not be related to a restricted category, such as "adult" or "gambling" sites. Furthermore, in addition to forbidden content proscribed under the card company's online compliance standards, the company may agree to allow the use of its transaction systems by the merchant for the sale of only pre-approved products or a pre-approved category or products that the merchant stipulates it will sell on their site to the exclusion of all others. In this case, the products and services that the merchants offer belong to a category that becomes part of the compliance standard. In this example, the merchant is not permitted to offer for sale any goods or services that are not related to those that were previously agreed upon by both the merchant and the vendor. In this manner, the online content detection will determine whether or not the merchant's site continues to sell those products and services that have been agreed upon, or whether the merchant has changed their product mix subsequent to the agreement and has violated their vendor agreement, based on any content relating to products or product category outside the pre-approved and agreed upon categories.

In another embodiment, the online content scanning and monitoring system can be used to verify and maintain a consistent brand identity or corporate image across all of a client's sites. In this embodiment, the client may be a corporation or a large institutional organization with a single uniform brand identity or corporate image that must be maintained across a number of affiliated web sites, in which each of the affiliated web sites is not under the direct technical control of the client. In this example, it is necessary for the client to ensure that its brand and image are presented uniformly and in a positive manner across all of the affiliated web sites. Therefore, the content scanning system must include standards that not only relate to the type of content that is presented on the site, but it must also define how that content is presented.

Specifically, it may define presentation information such as style-sheets, font sizes, markup languages, color schemes, image sizes, page data sizes and the like.

Furthermore, in those situations where the client has a large number of affiliated sites which have entered into a specific contractual relationship with the client, the client may require certain language relating to that contractual relationship be present on all of the affiliated sites. In this further embodiment, that contractual language becomes part of the compliance standard that the content scanning and monitoring system verifies. Furthermore, the client may in some cases also wish to validate that its partners or its affiliates do not violate any industry-wide regulations regarding advertising, pricing, etc. Specifically with regard to the non-profit sector, a number of federal and state laws and regulations specifically proscribe what can be advertised or offered on a non-profits firm's web site in addition to how that advertising is presented. In this embodiment, the content scanning and monitoring system must include as part of its compliance standards those regulations.

In a further embodiment, the content scanning and monitoring system can perform a site inventory and application profiling. In this embodiment, the client site and all affiliated sites are actually copied on to a vendor's server or a third party server accessible to the content scanning system for archival purposes. The archived web site can be used to compare against the current state of the client or affiliated web site and can determine when any changes have been made to the site or network topology, what those changes are, and whether those changes have resulted in the client falling out a compliance with any one of the number of standards that are being monitored by the system.

In yet a further embodiment, the contents scanning and monitoring system performs all or any combination of the above embodiments in order to provide a stronger standards compliance verification and assessment regime.

The content scanner of the present invention can employ a multi-phased methodology for detecting, inventory and scanning a client's web sites. In the first phase, the scope of a client's web presence or exposure to the public Internet is assessed. In particular, all of the client web sites can be determined using any one or a combination of a variety of Internet identification schemes. Specifically, the systems running a client's web sites can be determined using a list of specific domain names of the form www.clientdomainname-.com for example. Alternatively, the client's web site can be determined by a list of network node based on IP addresses, which have the form, 192.168.1.0, and which are unique to each system on the Internet. Furthermore, in the case of a client with affiliated websites that are not under its direct technical control, keywords can be used to discover websites separate from the client's own websites but that contain, refer to or use the client's image or brand identity. Furthermore in another embodiment, any one of these three mechanisms can be used to determine the other two with the result being a complete and comprehensive analysis of the client's Internet presence across any number of systems or servers, regardless of whether those systems or servers are under its direct technical control or not.

In this way, the first phase of the scan, namely site discovery can be performed. In this step either keywords, topics, IP addresses or domain names are used to determine what the scope of the scanning and monitoring system will be. In the case where only keywords or topics are known, the system can search the entire Internet for those relevant websites. In this case, the list of search results may be very large or may require either automated or manual intervention to narrow those results down to the proper candidate sites before the actual scan is launched. After this phase is complete, the scan proceeds to the next phase.

The next phase is the initial server scanning. In this case, based on the results obtained during the site discovery, the system scans the network blocks relating to the resulting sites to identify any running web servers. This scan for web servers can be configured at the client's discretion for varying degree of thoroughness, with the understanding that the more thorough the search the more time it requires to run. Specifically, the scan can be configured based on industry-wide technical standards such as a scan of the most common HTTP ports (for example, TCP ports 80 and 443) or it could be a complete scan of all possible TCP services on the network. It is understood that the latter scan is the most exhaustive but is also the most time consuming. At the completion of this phase, all of the web servers will have been identified.

Meanwhile, the next step of the scanning system can be conducted in parallel with the site scanning step or conducted subsequent to that step. In this step, the IP addresses of the sites must be determined so that an application and content scan can subsequently be performed. Site names or web server based on the search results are resolved to one or more IP addresses or block of IP addresses using any one of a variety of DNS resolution methodologies. This provides the identification of multiple IP addresses all of which run the same web server in a load balancing scheme. It is understood that under some conditions the load balancing servers are not running identical web sites.

Once the sites are discovered and their IP addresses determined and the TCP ports scanned, the system performs an initial profile (or first-pass scan) in order to obtain additional identification information. This information includes but is not limited to the title of the website, any initial network redirects such as HTTP or meta-refresh redirects, X.509 certificates information, and web server vendor and technical information (for example, Microsoft Internet Information Server or the Apache server or Netscape Enterprise server). In addition, the site is classified based on a rough categorization of the content on the page, such as of adult, gambling, e-merchant, online commerce, or the like. In an embodiment, this classification can based on a very simple keyword scan.

The next phase is site acquisition. During this phase, the entire site including the HTML, any style sheets, any XML, any documents, any media files and any images or the like are copied from the Internet to the computer system running the scanner so that it can be archived and analyzed.

Once archived, the system proceeds to the next phase, page analysis. Each of the pages that are stored on the scanner's archive are decomposed to their constituent elements. These elements include but are not limited to the content type such as HTML, XML or the like, authentication requirements, HTML validation, the page title, any hidden embedded text such as meta-tags, meta-keywords or meta-descriptors, the visible text of the page, any embedded resources such as images, media files, audio files, and any embedded documents such as PDF's or PostScript. After this step, all the HTTP web links are classified as local, neighbor or remote based on their relationship to the current webpage being analyzed. Furthermore those links that are broken (i.e. that refer to a page that is not available on the Internet) are explicitly identified.

Once this phase is complete, pages are scanned for sets of client-defined keywords or phrases. In this phase, both the forbidden content detection and content validation can be performed. After this step, a compromised-site detection test is performed. In this phase, pre-defined content searches may identify sites or pages that have been compromised, either as a result of data corruption, hardware failure, or software errors, or which may be the result of an unauthorized entry or network attack. For example, the Nimda worm leaves all attacked HTML pages on the infected server tagged with JavaScript that the content scanning system can identify. The content scanning system flags these pages as being compromised and identifies them as requiring further action or special attention. The content scanning may include text searching as well as searching of text derived from optical-character-recognition (OCR) of images or other processing of media files.

Once all of the scan phases are complete, all of the sites files are fingerprinted and validated, including files such as images, audio files, video files. These files are fingerprinted using a number of quantitative measures such as their size in bytes or a checksum value. Furthermore, common media files are validated to ensure that the actual file content matches the file name extension. For example, the system validates that a file name with an extension of ".jpg" is really a JPEG file and not some other content that this simply masquerading as a JPEG file. Finally, the combination of page structure, media fingerprints and other information is used by the scanner to create a single identifiable site fingerprint which is used to compare and match against future versions of the site to determine if any changes are made. Furthermore, the site fingerprint could be used to identify other sites which are either exactly or similarly structured to a particular site. Such analysis could reveal businesses or organizations which have copied another organization's web site, or a site that has been re-established, perhaps under another name or branding, after it has been removed from the Internet for previous policy violations.

Having archived the site, the content scanning monitoring system periodically rechecks the site on the Internet and determines whether or not any changes have been made. The system then analyzes those changes and reports as to whether or not they have taken the site out of compliance with any one of the number of standards that are associated with that client site.

Specifically, the content scanning and monitoring system can provide an easy to read report output format. The output includes a high-level summary information including the site scanned and the high-level identification information such as site name, IP address, title, number of keywords hits, etc. The summary also includes page details for each of those sites, including keyword hits, with the surrounding contextual information for easy analysis by non-technical personnel. The authentication requirements that are necessary in order to reach that page and other embedded links, images and other media files that are associated with that page, as well as any other analytic events are also identified in the report. These analytic events include any compromised sites that are detected or any changes or additions to IP addresses that may indicate a change in network topology. Finally, the report provides a list of page errors which can be used as to-do list for site support staff, including items such as broken links, spelling errors, HTML errors and other specified error conditions including but not limited to missing text information that is required in order to comply with the standards regime.

A number of alternative embodiments relating to scanning content on a local or wide area network are contemplated as well. For example, an exemplary embodiment of the content scanning and monitoring system can acquire the data from a data store or network location outside of the network on which the system itself resides. In this exemplary embodiment, classified as "active" or "server-side" content monitoring", the monitoring system acquires data or content from an external source and monitors it for content. In the active mode, the content monitoring system acquires data from a predetermined network location in the form of files for media files, webpages, or documents, and may copy them to a local storage device and performs a content monitoring scheme on the data acquired. In the first aspect of this embodiment, the network data store may be an external website unrelated to the network system on which the content monitoring system resides. This may be useful in contexts where a number of websites are partners or affiliates through a service or a product and their content needs to be verified against a predetermined set of rules. The content monitoring system will acquire certain predetermined documents and files and analyze them based on a predetermined set of rules and procedures to verify the presence or absence of a certain type of content.

In another exemplary embodiment the content monitoring system operates in a passive, or flow-through, mode. This exemplary embodiment involves monitoring the content passing through a network traffic management device such as a router, bridge, switch or other network traffic device. In the passive or flow-through mode, the content monitoring system monitors all of the network traffic flowing through a network traffic device, such as a router. This embodiment is useful in environments where certain types of content are easy to identify based on header information or packet information, such as protocol headers, file headers or IP headers. Furthermore, in the passive mode the data traffic over the network is not interrupted by the presence of a content monitoring system because the network traffic continues to flow through the router uninterrupted. The content monitoring system simply makes a duplicate or copy of the traffic flowing through the router and reviews it for content outside of the flow of ordinary network traffic.

In a third exemplary embodiment the content monitoring system operates in a proxy-based mode. In this embodiment, the content monitoring system monitors traffic outgoing from or incoming to a network server. The proxy-based mode interrupts the network traffic flow by design. Specifically, the content monitoring system operates as a proxy through which network traffic must pass, and passes or holds traffic based on the presence of certain content. For example, in one aspect of this embodiment the content monitoring system may determine that certain types of content may pass through to the network based on the presence of certain information but any network traffic that does not have that content information is withheld. In an alternative aspect, network traffic that does contain a certain piece of identified content is withheld, while network traffic that does not include that content is allowed to pass through.

This embodiment is useful in environments where sensitive information needs to be blocked from leaving or entering the network. For example, the system operating in the proxy-based mode may trap e-mail messages containing sensitive information or information which is a security risk from leaking through a network and bypassing any protections that may exist on an internal mail server. Specifically, while an internal mail server such as Lotus Notes or Microsoft Exchange Server may block outgoing e-mail traffic based on certain destinations or based on certain keyword content, these internal mail servers may be easily bypassed by simply using a web-based e-mail system such as Yahoo! Mail, Hotmail, or the like to send out the same information. The content monitoring system of the present invention overcomes this problem because regardless of where the mail is being sent from or sent to, the sensitive content must travel across the network.

The content monitoring system examines the outgoing network traffic and upon identifying sensitive information, blocks it regardless of whether the sensitive is being trafficked through an internal mail server, through a web-based mail system, or even through Internet relay chat (IRC), or an instant messaging client. For example, in the case of IRC traffic, an IRC client may be permitted to be opened and the chat session on a particular IRC channel initiated. The user may then be free chat over the network, however, if the user enters sensitive information and tries to pass it through into the rest of the IRC channel, the content management and monitoring system operating in the proxy mode will block that particular piece of information from passing to the IRC network while still allowing the user to remain connected to that IRC session. Related art network security devices act bluntly, prohibiting access to IRC channels or to IRC altogether. The system of the present invention, however, allows for control over content at the message level.

Similarly, it prevents the user from uploading sensitive information to Internet message boards or entering into any web-based forms or uploaded to news groups. The system of the present invention allows sensitive information to be tracked, regardless of the context in which it is delivered. Therefore, any sensitive information is blocked by the content monitoring system operating in proxy mode, regardless of whether that content is delivered through the web via HTTP, through e-mail via SMTP, through Usenet, IRC, peer-to-peer applications, or any other type of network protocol. Therefore, the content scanning monitoring system of the present invention allows the full range of network protocols and tools to be available to users of the network while still insuring that sensitive information is not trafficked across that network.

In this regard, the system of the present invention is content-centric, rather than protocol- or application-centric. Rather than merely examining content based on the protocol used to send it or the application used to generate it, the content monitoring system of the present invention examines the content itself directly. Once the content is detected the action taken by the system may differ depending on the protocol or the application, but the detection of content remains application or protocol neutral. In other words, regardless of how the content is encapsulated or pass over the network, the system is able to monitor the network for that traffic.

Furthermore, because the content monitoring system of the present invention can operate in an active mode, a passive mode, or a proxy-based mode, the content monitoring system has the ability to run any number of analyzer programs or toolsets against the content to determine what course of action to take in the even the content is detected. Toolsets or program can be created to parse out the content from various protocols. In a further embodiment the content monitoring system operates in a decision tree structure in which a first set of tools is run against a data stream to determine the type of content. Then, based on the type of content, a second toolset is run that is specific to that content type. This has the advantage of allowing technical change detection, in which content that has been already monitored and scanned once is continually or periodically rescanned and retested against the toolsets to determine whether or not the content has been changed and altered and, as such, in certain embodiments, a content monitoring system can determine roughly at what time the content has been changed.

Finally, the present invention allows for more sophisticated reporting functions than related art network security or policy compliance tools. Specifically, based on the type of scanning being performed, whether it is active, passive or proxy based, reports can be generated with varying frequencies such as daily, weekly or monthly that identify what types of traffic are being sent from and sent to certain resources on the network being monitored and identifying which content has been flagged as sensitive for the administrators to take further action.

Furthermore, and as noted earlier, the content monitoring and scanning system can be adjusted based upon its desired impact on the network traffic flow. For example, if an administrator chooses not to have the flow of traffic through its network interrupted, the administrator may choose to operate the content monitoring and scanning system in the passive mode to monitor the traffic through all of the routers in the network or a specific router on the network so that the traffic continues to flow through uninterrupted and yet all of the traffic is able to be monitored. However, the administrator may wish to limit or block entirely certain sensitive pieces of information from passing to or from the network, and so the administrator may operate the content monitoring and scanning system in the proxy-based mode so that network traffic is stopped, monitored for content (specifically that content the administrator chooses to monitor based on keyword, data types or network addresses) and then the traffic is routed accordingly.

The content scanning and monitoring system may be implemented in a variety of network environments as well. In the first implementation, the monitoring system may simply be software that resides on a network server running an ordinary network operating system such as Windows NT, Linux or other UNIX variant, Mac OS, or any other operating system. In a further embodiment the scanning and monitoring system may be software that resides on each terminal or desktop on the network from which sensitive information is not to be passed. In a further embodiment, the scanning and monitoring system may reside on the router, either as software within the router or through a separate data processing device, such as a computer, connected to the router to monitor and scan traffic passing through that router. Finally, the content monitoring and scanning system of the present invention may operate as a combination of any of the above in which software residing on terminals, at the server and/or at the routers, bridges, or switches communicate with one another to provide a secure scanning and monitoring system.

Further aspects and embodiments of the present invention will be described with reference to FIG. 2. FIG. 2 illustrates the content monitoring architecture according to an exemplary embodiment of the present invention. In this embodiment the content monitoring system includes a tasking interface 201 and a tasking database 202. The tasking interface 201 receives user or administrator input about how content is to be scanned and monitored. That input is stored in the tasking database 202. Depending on the type of content scanning required, one or more of a variety of traffic acquisition modules 210 are configured to access various types of network traffic based on the tasking database 202. For example, traffic acquisition modules 210 may include a service proxy module 211 that operates in the active or proxy flow mode, a site discovery module 212 that scans and searches a data store, or a website grabber or FTP site grabber module 213 that operates in the active mode to acquire data or files from the Internet or an external network. Furthermore, a network monitor module 214 may be used to provide passive monitoring of content over the network, whereas a real-time monitoring and countermeasures module 215 operates to block specific packets of data as they travel across the network, based on content within those packets and the results of the systems scan.

It is understood that the present invention contemplates modules written to access any network traffic protocol, regardless of whether the protocol is an industry standard, such as SMTP or telnet, or whether that protocol is proprietary, such as that found in a peer-to-peer system.

The tasking database 202 stores the administrator's content scanning and monitoring options for each of these modules depending on the type of scanning required. It is understood that in various aspects of this embodiment one or more of the modules 211 through 215 may be used by the system simultaneously.

Once each of the modules is configured and activated, content that is to be scanned is stored in a raw data storage 220 that may be on the network or on a separate network data storage device. Raw data storage 220 may be a hard disk drive, disk drive array, or other network storage device.

In one aspect of the invention the service proxy module 211 may store in raw data storage 220 any outgoing network traffic or Internet web traffic through flowing into or from the network using any of a variety of protocols, including but not limited to mail (SMTP), FTP, Gopher, HTML, IRC or Instant Messenger protocols. In this aspect, because the traffic is stored on raw data storage 220, the scanning can proceed and release to the network that traffic which is permitted to flow into or from the network. In another aspect, the network monitor module 214 operating in the passive monitoring mode will store a duplicate of the network traffic passing through the network device where the monitoring is taking place onto the raw data storage 220, and scanning can proceed on the data stored in raw data storage 220 without interrupting the flow of network traffic.

Once the data to be scanned has been stored in raw data storage 220, analysis infrastructure 230 is used to analyze the data for content based on predetermined rules, structures, procedures or keywords that are determined prior to the operation of the content scanning. Analysis infrastructure 230 will be described in further detail with reference to FIG. 2B. Once the analysis infrastructure has completed its work, the data is passed to the event database 240. Event database 240 contains information about the results of the search, specifically if any search terms or keywords appeared with what frequency and in what network context, be it protocol, data file or data stream, as well as the action to be taken based on the presence of those search terms or keywords in the traffic. Information stored in the event database 240 is then passed to the reporting and analysis interface 250 which can be configured to provide reporting on a periodic basis or to provide automatic alarm notification 260 to administrators of the network.

Figure 2A:
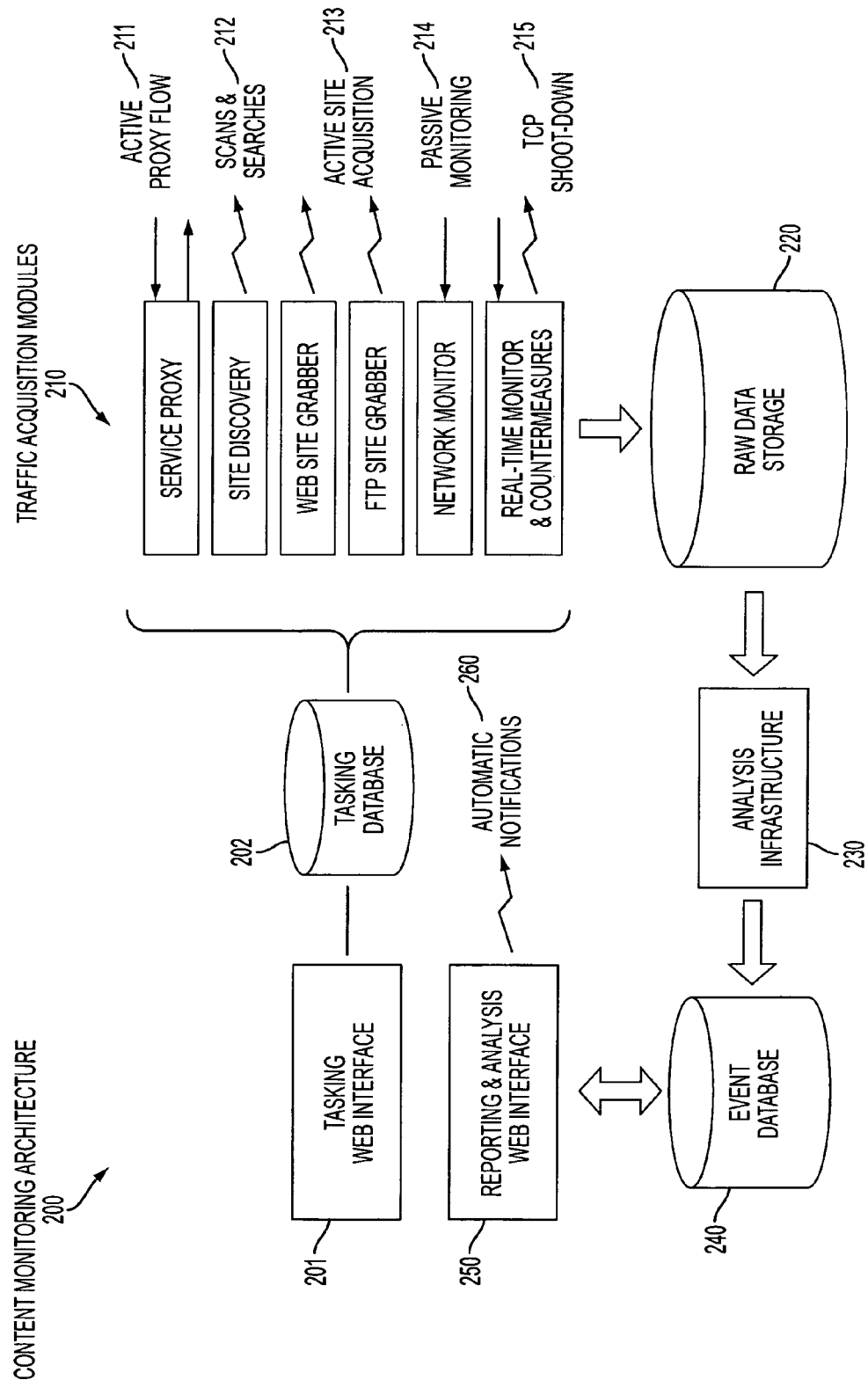
FIGS. 2A-2B are diagrams illustrating the content scanning system according to an embodiment of the present invention.

As is seen in FIG. 2A, the content monitoring scanning system described in this exemplary embodiment is capable of operating on a number of separate and incompatible network traffic protocols at once, collecting and pulling the network traffic down to a single raw data storage for analysis by a single analysis infrastructure 230. In this manner the only configuration that is required by the administrator to tailor the system for their particular network environment is to select which modules 211 through 215 are active and to identify within each of those modules 211 through 215 what specific types of content are to be monitored. The content scanning and monitoring system of the present invention can be extended and customized to accommodate any type of network traffic.

Figure 2B:
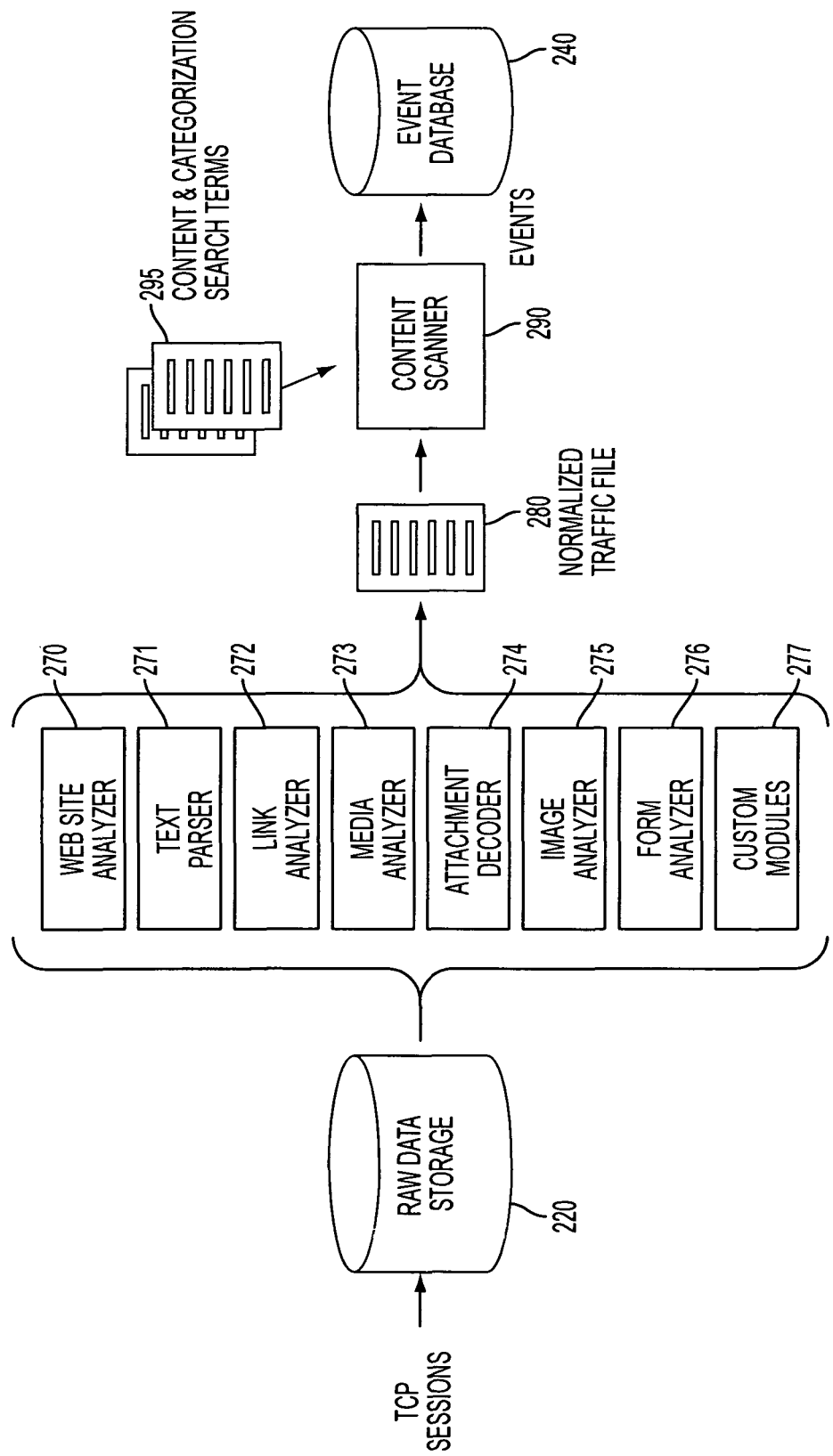

FIG. 2B illustrates in greater detail the analysis infrastructure 230 shown in FIG. 2A. Specifically, analysis infrastructure 230 takes as input the data stored on the raw data storage 220 from various TCP sessions operating from each of the modules 211-515 that have been selected for operation. The analysis infrastructure 230 may perform a variety of operations on the data stored in the raw data storage 220, including but not limited to those operations illustrated in FIG. 2B. Among those operations to be performed on the raw data storage 220 are a website analyzer 270, a text parser 271, a link analyzer 272, a media analyzer 273, an attachment decoder 274, an image analyzer 275, a form analyzer 276 and custom modules 277.

The particular website analyzer 270 analyzes the content on a website for predetermined information. The predetermined information may take the form of specific types of content, whether that content is part of the presentation layer or the data layer. For example, text parser 271 parses all of the text stored in the raw data storage 220 relating to a foreign network resource or traffic outbound from the network destined for a foreign network. The text may include not only the text that is readable or visible, such as the text from a web page that is displayed by a web browser, but also the hidden text, such as tags, metadata information, or other embedded text that is not displayed within a browser but is present in the source information of the HTML file of the Web page.

Other examples are also illustrated. The link analyzer 272 may be configured to analyze whether links from a webpage are active or dead (i.e., links that point to network resources no longer available). It may also be used to verify that no links point to websites that are prohibited under a predetermined compliance scheme. The media analyzer 273 may be configured to verify the presence of certain types of media files on the network resource. In addition, it may also be configured to verify that media files present contain data in the format indicated by the media file's filename and file extension. In other words, if the filename and extension indicate a particular type of media file, the media analyzer 273 verifies that the content within that media file matches that media type. For example, the media analyzer would check that a file with the extension .WAV contains audio data.

Attachment decoder 274 may be used to decode attachments to mail messages inbound into the network or outbound from the network. The decoder may extract from the attachment the type of file in order to determine whether or not executable files (that may contain viruses or are otherwise a threat to network security) are being delivered in-bound from a foreign network resource. The present invention has the ability to strip of such attachments once they are detected.

Image analyzer 275 performs an operation similar to that of media analyzer 273 in that the image analyzer may verify that files labeled as image files actually contain image data and not any other type of information. In a more sophisticated embodiment, image analyzer 275 may use pattern recognition algorithms to verify that the image is one that is required or prohibited under a particular monitoring scheme. Form analyzer 276 parses the content entered into forms and the destination to which the content of those forms will be submitted in order to verify that no prohibited or secure information is entered into form on the web for delivery, thereby bypassing filters on the network's mail servers, ordinary proxy servers, or firewalls.

The custom modules 277 may include any other analysis programs that are tailored for specific types of network content or specific types of network traffic that are not covered by any of the analyzer programs 270 through 276. The analyzers 273-577 produce output that is collected into a normalized traffic file 280. The normalized traffic file 280 contains all of the traffic in a complete or an abbreviated form regardless of the manner or protocol in which that content was originally encapsulated on the network. For example, information that was present in a form or was text on a webpage or as a metatag or embedded within an image file is originally encapsulated on the networks in separate data or file structures. However, after the analysis performed by the analyzers 270 through 277, all of that output is extracted into a normalized traffic file 280 that is passed to the content scanner 290.

Content scanner 290, in conjunction with content and categorization search terms 295 selected by the administrators of the system, scans the normalized traffic file for the presence of any of keywords, specific blocks of information, or other type of identifiable content and stores the output in the event database 240. As a result of this procedure, the event database 240 contains a comprehensive list of the output resulting from scanning the entirety of network traffic across the network for specific search terms, categories of information, other predetermined data types. The event database 240 also includes information about what action to take based on the detection of a particular type of content or data.

Event database 240 contains information about the presence within the entirety of network traffic flown across the network many of the predetermined search terms, data types, data categories or other pre-selected information collectively stored in the categorization search terms 295. As noted earlier, event database 240 outputs the information to the reporting and analysis interface for reporting to administrators in a variety of modes such as periodic report generation or alarm notification depending on the type of content and the type of network traffic in which that content was found.

The content monitoring and scanning system of the present invention is able to comprehensively scan all of the network traffic passing through the network, regardless of whether that traffic is inbound into the network on which the content monitoring system resides, or whether that information is outbound from the network. The system can also acquire data from external networks at predetermined intervals for scanning and content monitoring. The system allows that information to be scanned and monitored for particular content or types of content regardless of the manner or structure in which it is present on the network or protocol in which it is carried. The content monitoring and scanning system of the present invention obviates the need for separate content management systems or administration systems for each of different network protocols or data type passing through the network.

In a further embodiment, the content analysis and monitoring system of the present invention may analyze the network information and topology of a resource on a network, such as a website, to determine any relationships. The system may analyze the network relationships by analyzing the site's outbound links, by analyzing network directory links to determine whether any other network resources or sites share the same DNS server, mail server, or web server as the target site, or by analyzing the proximity of sites in the network sense.

In one aspect of this exemplary embodiment, the system of the present invention collects information about any outbound hyperlinks (or "links") from the target website or any sites that are related to the target website by network topology or address-space. The outbound links may include ordinary hyperlinks (of the form '<a href="outbounddestination.com">Outbound Hyperlink</a>', for example), image map hyperlinks, or destinations of hypertext forms (based on POST information, for example). This information may reveal any crossover between network-related sites and the target website, such as, for example, whether payment or billing forms on related sites are sent to the credit card processing pages of the target website.

In a further aspect of the invention, the analysis and monitoring system analyzes the network and Internet information about a website. In particular, the system obtains the IP-address of a web server hosting a target website from a DNS (domain name server), and then investigates the network resources or servers at IP-addresses related to the target website's IP-address. The system may also determine the mail server or web server IP-address, and then use this information to compare against other sites, to see if the target site is sharing a mail server or web server with any other sites.

In still a further aspect, related IP-addresses may be determined by scanning IP-addresses from a defined subnetwork. For example, one common subnetwork would include all IP addresses that share the same first three digits (also known as the class C address). For example, if a target website has an IP-address of 123.123.123.123, the system of the present invention scans IP-addresses having the form 123.123.123.x and analyzes the content found there. This would reveal what other network resources or websites are hosted or stored on the same server or on servers that are "nearby" in a network sense. Thus, if another website is found at 123.123.123.6, that site is likely stored on the same server, in the same data center, or on a server owned by the same company as the server which hosts the target website.

Furthermore, by obtaining the IP-addresses of websites that are close to or related to the target website based on network topology or characteristics, those IP-addresses may be resolved into domain names (of the form domainname.com) that can be cross-referenced against the WHOIS database. The WHOIS database stores administrative, technical and other contact information relating to domain name and IP address registrations and assignments. This analysis can be used to determine if the owner or operator of the target website also owns or operates other websites. Similarly, any other name or address registry can be queried using information gathered during a scan or the analysis of content. In this sense, while the network analyzer gathers data about network specific information, the information once collected may reveal any "real-world" relationships, including financial or business administrative relationships, between sites that have a technical and network relationship.

In another aspect of the present exemplary embodiment, the system of the present invention may parse the text on related sites for contact information, such as names, postal addresses, and telephone numbers. This information may then be cross referenced against reverse-lookup telephone directories, or credit-reporting databases, to verify or determine the identity of the owners or operators of related sites, and to compare this information against known information about the owner or operator of the target website.

Thus, one of the valuable features of the present invention is its ability to scan a target website, determine its network information, and then determine what sites and computer systems are "nearby" the target site in the network or virtual world, but then to further determine real-world information about those sites, and then determine if there is any real-world relationship between these sites and the target sites. Thus the ability to cross from the virtual or network space into the real world is significant because it enables, in an automated and thorough manner, a wide variety of content and identity verification and validation.

For example, if a site localmerchant.com has applied to a credit card company for online credit card processing services, the processing provider may require that its clients do not sell adult material or services using their processing systems. The present invention is able to determine based on localmerchant.com's IP-addresses and a scan of its Class C address space if localmerchant.com is hosted in a data center along with a number of adult content websites. This fact in and of itself may not be indicative of any fraud or bad faith, because very often diverse and unrelated websites are hosted in datacenters of hosting providers geographically and otherwise physically remote from the business that owns and runs the website. However, the system of the present invention may be used to determine if there is any real-world relationship between localmerchant.com and the adult sites that are close to it in their address-space, which relationships may include common ownership, for example, based on information obtained from the content scanning of those sites and then cross-referencing that against any one or more databases that store real world information, such as the WHOIS database, telephone directories, credit report databases, business directories or the like, for example. Furthermore, by analyzing outbound links from the sites being scanned, the system is able to determine whether the adult sites are funneling their payment and billing processing through the credit card processing pages of localmerchant.com, in violation of their agreement with the credit card processing firm.

It is understood that the discussion above relating to scanning the Class C address space is only one example of the many ways the system of the present invention may obtain and scan a large number of addresses that are related to the address of a particular website or network resource.

By way of further examples, the system of the present invention may perform a DNS scan. In the DNS scan, the system resolves each IP address in the neighborhood of the target site and performs a reverse directory lookup to identify the site. The content at the resolved site is scanned in any of the manners discussed herein. The DNS scan has the advantage of being minimally intrusive, making it unlikely that the resolved sites (those in the "neighborhood" of the target site) will be able to detect the scan.

Another example is the web scan. The web scan performs TCP probes of common web ports across all IP addresses in the designated neighborhood. Common web ports might be port 80, 443, 8000, 8080, 8001, or any port widely recognized as the TCP port of a web server. If the web scan was performed with a reasonably interval or delay between the TCP port probes of a given IP address, the scan may be able to proceed undetected by security or firewall services running on the host at that the IP address.

A further scan is the full scan, in which the system of the present invention performs a TCP probe of all 65,535 ports on each IP address in the neighborhood. This is extremely time-consuming and network and resource intensive, both for the scanning system as well as for the host of the IP address being scanned. Furthermore, unless the scan is slowed down considerably and the order in which the ports are scanned is randomized, it is likely that the scan would be detected by security software and services running on the host at that IP address.

In this regard, the system of the present invention is able to identify real-world relationships between websites that may be of interest to credit and banking institutions, for example from the network analysis combined with the content and scanning methods described earlier. These network and content scans may be run periodically to verify that client merchants are not violating their agreement. In a further embodiment, the network scanning system identifies websites in which content that is expected, such as text, is not found. For example, if the system determines that a website's pages are predominantly, or entirely, image maps or image data, that may be an indication that the site in question is an adult site The present invention as described herein allows either a vendor or client to verify that a website, group of websites, web server or group of web servers comply with any of one or more of a number of required standards. Because the present invention allows the scanning and assessment of the site to be completely automated it provides a very fast and very cost effective solution for assessing and determining compliance with one or more compliance standards. Furthermore, because it is automated the system is highly scalable and is suitable as both an internal mechanism for scanning the entire public Internet for a vast number of websites affiliated with a client's website, in which the number of affiliated website is far too large to be monitored either manually or with a multitude of separate and disconnected compliance systems.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method comprising:
   scanning a network device using identity information to identify a server running on the network device, the network device being associated with an entity;
   retrieving content from the server;
   dividing the content into constituent elements;
   analyzing the constituent elements to determine if at least one of a keyword or a phrase associated with standards compliance is present in the content;
   determining a first fingerprint of the content;
   determining a second fingerprint of the network device based on the first fingerprint of the content;
   generating a report including at least one of a result of the analyzing or the second fingerprint of the network device;
   identifying that a first one of the constituent elements as a link to second content on a second server; and determining multiple internet protocol addresses by querying a domain name server with a domain name associated with the entity; and
   determining that the link is a broken link because the second content is not available at the second server, the report including information about the broken link, wherein the identity information includes multiple internet protocol addresses.

2. A method as defined in claim 1, wherein the at least one of the keyword or the phrase associated with the standards compliance identifies forbidden content.

3. A method as defined in claim 1, further comprising archiving the content.

4. A method as defined in claim 1, further comprising comparing the content to archived content to determine if the content has changed since the archived content was archived.

5. A method as defined in claim 1, wherein the identity information is a domain name.

6. A method as defined in claim 1, further comprising searching a plurality of network devices for a keyword associated with the entity to identify the network device.

7. A method as defined in claim 1, wherein scanning the network device using the identity information to identify the server comprises performing a port scan of the network device.

8. A method as defined in claim 1, further comprising determining that the content has a filename extension associated with a media type that is different than the media type of file, the report including information about the media type of the content.

9. A method as defined in claim 1, further comprising detecting whether the network device is compromised as a result of at least one of hardware malfunction, software error, virus, or network intrusion.

10. A method as defined in 1, further comprising determining at least one of a title of the content, redirect information associated with the server, certificate information associated with the server, whether the server includes a certificate, and vendor information associated with the server.

11. A method as defined in claim 1, wherein the fingerprint includes a checksum of the content.

12. A tangible computer readable medium that is not a signal, the computer readable medium storing instructions that, when executed, cause a machine to at least:
   scan a network device using identity information to identify a server running on the network device, the network device being associated with an entity;
   retrieve content from the server;
   divide the content into constituent elements;
   analyze the constituent elements to determine if at least one of a keyword or a phrase associated with standards compliance is present in the content;
   determine a first fingerprint of the content;
   determine a second fingerprint of the network device based on the first fingerprint of the content;
   identify that a first one of the constituent elements as a link to second content on a second server;
   determine multiple internet protocol addresses by querying a domain name server with a domain name associated with the entity; and
   determine that the link is a broken link because the second content is not available at the second server, the report including information about the broken link, wherein the identity information includes the multiple internet protocol addresses.

13. A tangible computer readable medium as defined in claim 12, wherein the instructions, when executed, further cause the machine to generate a report including at least one of a result of the analyzing or the second fingerprint of the network device.

14. A tangible computer readable medium as defined in claim 13, wherein the instructions, when executed, cause the machine to determine that the content has a filename extension associated with a media type that is different than the media type of file, the report including information about the media type of the content.

15. A tangible computer readable medium as defined in claim 12, wherein the at least one of the keyword or the phrase associated with the standards compliance identifies forbidden content.

16. A tangible computer readable medium as defined in claim 12, wherein the instructions, when executed, further cause the machine to archive the content.

17. A tangible computer readable medium as defined in claim 12, wherein the instructions, when executed, cause the machine to compare the content to archived content to determine if the content has changed since the archived content was archived.

18. A tangible computer readable medium as defined in claim 12, wherein the identity information is a domain name.

19. A tangible computer readable medium as defined in claim 12, wherein the instructions, when executed, cause the machine to determine the identity information for the network device associated with the entity by searching a plurality of network devices for a keyword associated with the entity to identify the network device.

20. A tangible computer readable medium as defined in claim 12, wherein the instructions, when executed, cause the machine to scan the network device using the identity information to identify the server comprises performing a port scan of the network device.

21. A tangible computer readable medium as defined in claim 12, wherein the instructions, when executed, cause the machine to detect whether the network device is compromised as a result of at least one of hardware malfunction, software error, virus, or network intrusion.

22. A tangible computer readable medium as defined in 12, wherein the instructions, when executed, cause the machine to determine at least one of a title of the content, redirect information associated with the server, certificate information associated with the server, whether the server includes a certificate, and vendor information associated with the server.

23. A tangible computer readable medium as defined in claim 12, wherein the fingerprint includes a checksum of the content.

24. An apparatus comprising:
   a memory storing machine readable instructions; and
   a processor to execute the instructions to:
      scan a network device using identity information to identify a server running on the network device, the network device being associated with an entity;
      retrieve content from the server;
      divide the content into constituent elements;
      analyze the constituent elements to determine if at least one of a keyword or a phrase associated with standards compliance is present in the content;
      determine a first fingerprint of the content;
      determine a second fingerprint of the network device based on the first fingerprint of the content;
      generate a report including at least one of a result of the analyzing or the second fingerprint of the network device;
      identify that a first one of the constituent elements as a link to second content on a second server;
      determine multiple internet protocol addresses by querying a domain name server with a domain name associated with the entity; and
      determine that the link is a broken link because the second content is not available at the second server, the report including information about the broken link, wherein the identity information includes the multiple internet protocol addresses.

* * * * *

UNITED STATES PATENT AND TRADEMARK OFFICE
CERTIFICATE OF CORRECTION

| | | |
|---|---|---|
| PATENT NO. | : 8,683,031 B2 | Page 1 of 1 |
| APPLICATION NO. | : 10/976181 | |
| DATED | : March 25, 2014 | |
| INVENTOR(S) | : Green et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2041 days.

Signed and Sealed this
Twenty-first Day of July, 2015

Michelle K. Lee
*Director of the United States Patent and Trademark Office*